(12) United States Patent
Nelson et al.

(10) Patent No.: US 9,575,491 B1
(45) Date of Patent: Feb. 21, 2017

(54) SYSTEM AND METHOD FOR AUTOMATED MACHINE OPERATION

(71) Applicant: Caterpillar Underground Mining Pty. Ltd., South Burnie (AU)

(72) Inventors: Anthony K N Nelson, Burnie (AU); Joshua G. Bynon, Br (AU)

(73) Assignee: Caterpillar Underground Mining Pty Ltd, South Burnie (AU)

( * ) Notice: Subject to any disclaimer, the term of this patent is extended or adjusted under 35 U.S.C. 154(b) by 0 days.

(21) Appl. No.: 14/844,336

(22) Filed: Sep. 3, 2015

(51) Int. Cl.
G01C 23/00 (2006.01)
G05D 1/00 (2006.01)
G05D 1/02 (2006.01)
E02F 9/20 (2006.01)

(52) U.S. Cl.
CPC ........... G05D 1/0088 (2013.01); E02F 9/205 (2013.01); E02F 9/2054 (2013.01); G05D 1/0291 (2013.01)

(58) Field of Classification Search
CPC ..... G08G 1/0116; E21D 9/0671; E21D 9/065; E21D 9/0664; G05D 1/021; G05D 1/0088; G05D 1/0291; G06Q 50/02; G06Q 10/06393; G09B 9/00; E02F 9/205; E02F 9/2054
See application file for complete search history.

(56) References Cited

U.S. PATENT DOCUMENTS

| | | | |
|---|---|---|---|
| 4,774,573 A * | 9/1988 | Mount, II | E21B 47/0002 348/163 |
| 5,477,505 A * | 12/1995 | Drumheller | E21B 47/16 166/250.01 |
| 5,767,400 A * | 6/1998 | Nakano | E21B 33/124 166/250.03 |
| 6,044,312 A | 3/2000 | Sudo et al. | |
| 8,260,483 B2 | 9/2012 | Barfoot et al. | |
| 8,571,765 B2 | 10/2013 | Lehtinen et al. | |
| 2005/0155473 A1* | 7/2005 | Gass | B23D 59/001 83/58 |
| 2011/0160920 A1* | 6/2011 | Orr | A01B 79/005 700/283 |
| 2011/0192598 A1* | 8/2011 | Roddy | E21B 33/13 166/253.1 |
| 2013/0073151 A1 | 3/2013 | Wada et al. | |
| 2014/0121972 A1* | 5/2014 | Wessling | E21B 41/00 702/6 |
| 2014/0214235 A1 | 7/2014 | Kini et al. | |
| 2015/0142258 A1* | 5/2015 | Sugihara | G06Q 50/02 701/32.3 |

FOREIGN PATENT DOCUMENTS

JP  2003307093 A  * 10/2003
JP  2007291849 A  * 11/2007

OTHER PUBLICATIONS

Automation keeping underground workers safe at LKAB Malmberget Mine; Year:2008, pp. 5, Isuue 3, Caterpillar Global Mining, USA.
Brett Cook, Sandvik Mining and Construction: News—Case Stories; Date: May 23, 2007, Sandvik Mining and Construction, Sweden.

* cited by examiner

*Primary Examiner* — Tuan C. To

(57) ABSTRACT

A system for automated operation of a plurality of machines deployed on an underground worksite is provided. The system includes a monitoring module provided on-board each of the plurality of machines. The system also includes an area isolation control module associated with the underground worksite. The system further includes a machine control module coupled to the monitoring module and the area isolation control module.

18 Claims, 3 Drawing Sheets

SYSTEM AND METHOD FOR AUTOMATED MACHINE OPERATION

TECHNICAL FIELD

The present disclosure relates to a system and method for automated operation of a number of machines, and more particularly to the system and method for automated operation of the machines deployed at an underground worksite.

BACKGROUND

In fleet management applications, a number of machines such as mining machines operate at an underground worksite. The machines are generally controlled by an operator seated at a remote operator station. The machines are configured to perform various operations, such as transportation of payload from load points to dump points, drilling, hammering, and the like. During loading and unloading of the payload, the machines travel between the load and the dump points along a predetermined route. The route may be defined by the operator or by a production planning software. However, sometimes obstructions, barriers, personnel or machinery may lie in the route of the machines.

U.S. Published Application Number 2014/0214235 describes a control system for use with a plurality of machines operating at a worksite. The control system may have a plurality of communicating devices, and a plurality of onboard controllers, each mountable to the plurality of machines. The control system may also have an offboard controller in communication with the plurality of onboard controllers via the plurality of communicating devices. The offboard controller may be configured to selectively assign each of a plurality of sequentially arranged dump targets for use by each of the plurality of machines based on an order in which the plurality of machines arrive at a dump location. The offboard controller may be further configured to make a determination that lanes extending to two dump targets of the plurality of sequentially arranged dump targets overlap, and selectively skip assignment of one of the two dump targets based on the determination.

SUMMARY OF THE DISCLOSURE

In one aspect of the present disclosure, a system for automated operation of a plurality of machines deployed on an underground worksite is provided. The system includes a monitoring module provided on-board each of the plurality of machines. The monitoring module is configured to generate a signal indicative of one or more operational parameters associated with the respective machine. The system also includes an area isolation control module associated with the underground worksite. The area isolation control module is configured to generate a signal indicative of a presence of at least one of a machine bather and a personnel barrier at the underground worksite. The system further includes a machine control module coupled to the monitoring module and the area isolation control module. The machine control module is configured to receive the signal indicative of the one or more operational parameters associated with the respective machine based, at least in part, on a loaded state of the respective machine. The machine control module is also configured to receive the signal indicative of the presence of at least one of the machine barrier and the personnel bather at the underground worksite. The machine control module is further configured to control an automated traversal of the respective machine on the underground worksite between a load point and a dump point, based at least in part, on the received signals and a site map of the underground worksite.

In another aspect of the present disclosure, a method for automated operation of a plurality of machines at an underground worksite is provided. The method includes receiving a signal indicative of one or more operational parameters associated with each of the plurality of machines. The method also includes receiving a signal indicative of a presence of at least one of a machine barrier and a personnel bather at the underground worksite. The method further includes controlling an automated traversal of the respective machine on the underground worksite between a load point and a dump point, based at least in part, on the received signals and a site map of the underground worksite.

Other features and aspects of this disclosure will be apparent from the following description and the accompanying drawings.

DETAILED DESCRIPTION

Figure 1:
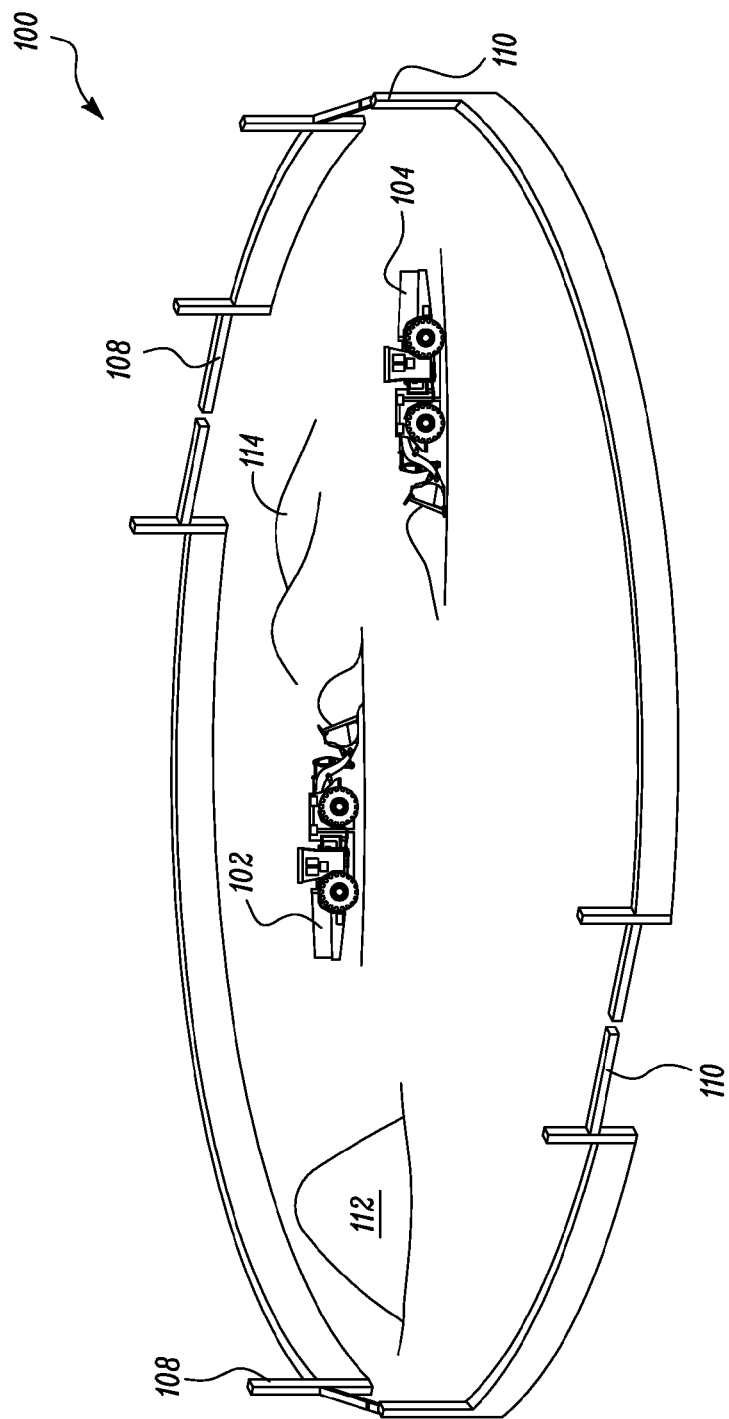
FIG. 1 is a schematic view of an exemplary underground worksite having a number of machines, according to one embodiment of the present disclosure.

Wherever possible, the same reference numbers will be used throughout the drawings to refer to the same or the like parts. FIG. 1 is a schematic view of an exemplary underground worksite 100, hereinafter referred to as worksite 100. The worksite 100 may embody an underground mine A number of different machines 102, 104 such as a load haul dump, may operate on the worksite 100 to perform various operations, such as, loading and unloading of payload, earth drilling, rock excavation, and the like. Although the machines 102, 104 described in connection with this disclosure are embodied as load haul dump machines, alternatively the machines 102, 104 may include any other type of same or different mining vehicles, such as those used for drilling, hammering, loading and unloading of payload, etc., without any limitation. Further, for the purpose of simplicity only two machines 102, 104 are described as being deployed at the worksite 100. The number of machines operating at the worksite 100 may vary based on the application.

The machines 102, 104 may be embodied as autonomous vehicles that are controlled by operators seated at a remote operator station 106. Typically, the remote operator station 106 may be located off the worksite 100. The remote operator station 106 may enable remote monitoring and/or controlling of various functions related to the operation of the machines 102, 104 deployed on the worksite 100. The remote operator station 106 may include an operator interface (not shown). The operator interface may include one or more input devices such as pedals, keyboards, steering, joystick, knobs, levers, switches, display devices, and so on. The input device may assist the operator to operate the machine 102, 104. Further, the remote operator station 106 may also store procedures or commands in a module that assists the operator in operating the machines 102, 104.

In one embodiment, the machines 102, 104 may be communicably coupled to each other and to the remote operator station 106 via a communication system (not shown). The communication system may be, but not limited to, a local area radio network (LARN), a wide area network (WAN), a local area network (LAN), an Ethernet, an Internet, an Intranet, a cellular network, a satellite network, or any other suitable network for transmitting data between the machine 102, 104 and the remote operator station 106. In various embodiments, the communication system may include a combination of two or more of the aforementioned networks and/or other types of networks known in the art. The communication system may be implemented as a wired network, a wireless network, or a combination thereof. Further, data transmission between the machines 102, 104 and the remote operator station 106 may occur over the communication system in an encrypted, any other secure format, or in any of a wide variety of known manners.

The worksite 100 may include at least one entry point and one exit point to allow ingress and egress of machines or persons, such as servicing or maintenance personnel. In the illustrated embodiment, the worksite 100 includes two entry points 108 and two exit points 110. Alternatively, the worksite 100 may include multiple entry and exit points. Further, in some embodiments, the entry and exit points 108, 110 may be located at the same physical location at the worksite 100. The entry and exit points 108, 110 may include suitable mechanisms to monitor the persons and the machines 102, 104 entering or leaving the worksite 100 through the respective points 108, 110.

The machines 102, 104 may transport payload from a load point to a dump point. Although a single load point 112 and a single dump point 114 is shown in the accompanying figures, the worksite 100 may include multiple load points and dump points based on operational requirements. The machines 102, 104 may traverse between the load point 112 and the dump point 114 in order to transport the payload.

The present disclosure relates to a system 200 for controlling automated operation of the machines 102, 104 on the worksite 100. More particularly, the system 200 is configured to control automated traversal of one or more machines 102, 104 on the worksite 100 between the respective load points and dump points. For exemplary and illustrative purposes, the system 200 will be explained with respect to a single machine 102. However, the disclosure is equally applicable to the machine 104 without any limitation.

Figure 2:
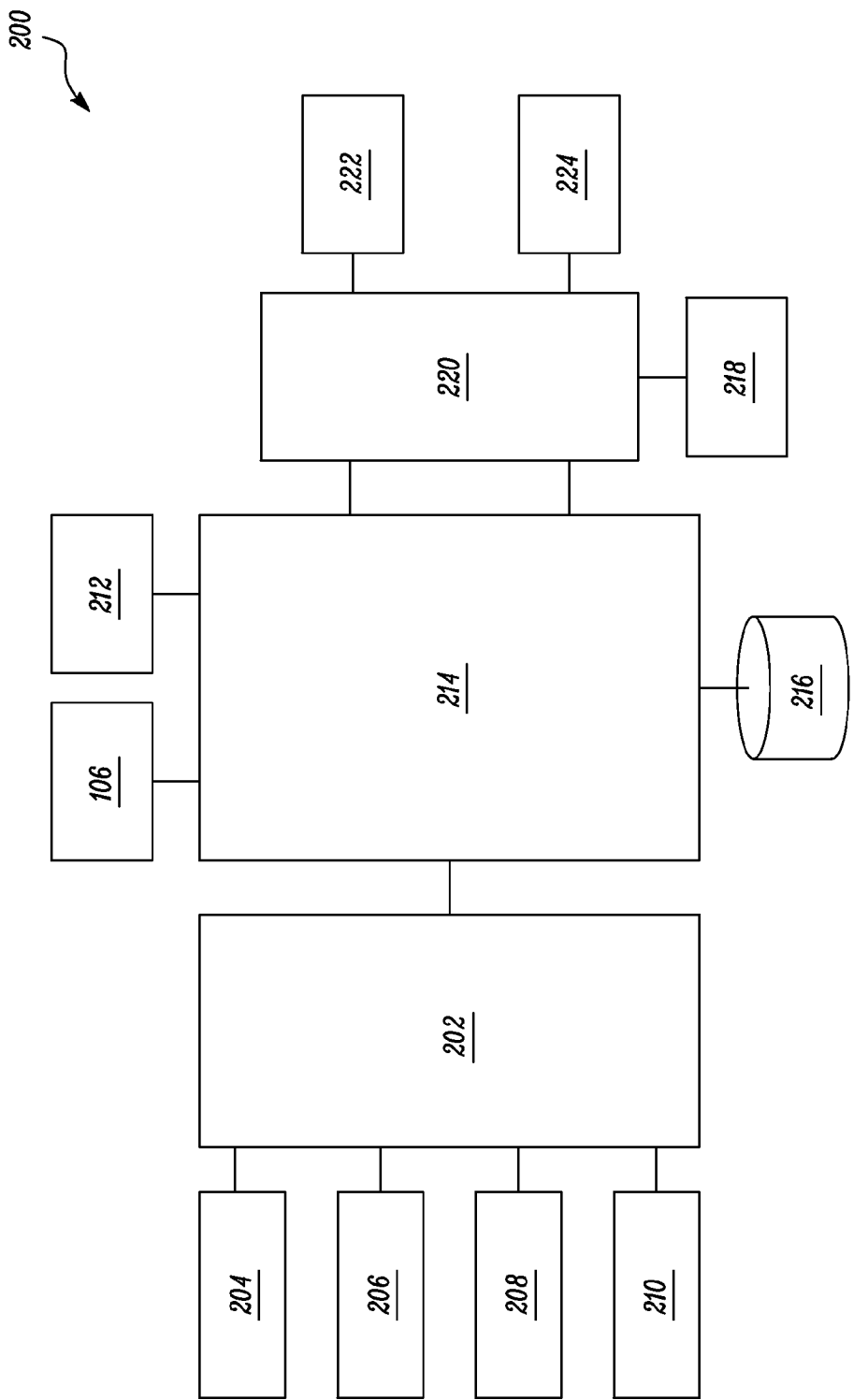
FIG. 2 is a block diagram of a system for automated operation the machines deployed on the underground worksite, according to one embodiment of the present disclosure.

Referring to FIG. 2, the system 200 includes a monitoring module 202. The monitoring module 202 is provided on-board each of the machines 102. For example, the monitoring module 202 may be provided on the worksite 100. The monitoring module 202 is configured to generate a signal indicative of one or more operational parameters associated with the machine 102. The operational parameters may include at least one of a speed of the machine 102, a position of the machine 102, and a direction of heading of the machine 102.

The monitoring module 202 may include a sensing element 204 configured to generate a signal indicative of the speed of the machine 102. The sensing element 204 may be present on-board the machine 102 or at the worksite 100, and may include any contact type or contactless type sensing element. In one example, the sensing element 204 may include a transmission output sensor to detect the speed of the machine 102. The transmission output sensor is present on-board the machine 102. In other examples, the speed of the machine 102 may be detected by a LADAR sensor. Alternatively, any other speed detection means may be used to determine the speed of the machine 102.

Further, the monitoring module 202 may include sensing elements 206 to detect the position of the machine 102. The position of the machine 102 may include any one of a spatial position of the machine 102 or a position of a linkage assembly of the machine 102. In one example, the sensing element 206 may include a LADAR sensor to determine the spatial position of the machine 102. In another example, a number of image capturing devices 208, such as cameras, associated with the machine 102 or present at the worksite 100 may be used to confirm the spatial position of the machine 102. The position of the machine 102 on the worksite 100 may also be determined based on other inputs such as data representative of some fixed constructions on the worksite 100, for example, expected or surveyed wall positions, and so on.

The position of components of the linkage assembly, such as an implement, a linkage member, hydraulic cylinders, may also be measured by the sensing elements 206. In one example, the sensing element 206 may include rotary sensors to measure the position of the components of the linkage assembly. Alternatively, any other sensing means that detect the articulation, lift angle, or tilt angle of the components may be used to determine the position of the components of the linkage assembly. In another example, the sensing element 206 may include articulation sensors to sense an angle of an engine of the machine 102 and/or the components of the linkage assembly, such as the implement.

The monitoring module 202 may also include an inertial monitoring unit 210. The inertial monitoring unit 210 may be configured to determine the speed of the machine 102, the positioning of the machine 102, the heading direction of the machine 102, and gravitational forces on the machine 102. The inertial monitoring unit 210 may in turn include accelerometers, gyroscopes, magnetometers, and the like for detection purposes. It should be noted that each of the machines 102, 104 operating on the worksite 100 includes separate monitoring modules 202 provided on-board the respective machine 102, 104.

Further, the system 200 includes a load indication module 212. The load indication module 212 is provided on-board the machine 102. The load indication module 212 is configured to generate a signal indicative of a loaded state of the machine 102. The load indication module 212 may include load detection sensors configured to measure a quantity of payload present within the implement of the machine 102. The load indication module 212 may include load cells, piezoelectric sensors, strain gauges, or any other sensing means that indicates the presence or the amount of the payload within the implement of the machine 102. Alternatively, the load indication module 212 may be configured to generate a signal indicative of whether the machine 102 is in the loaded state or not. In another example, the load indication module 212 may include an algorithm that determines whether the machine 102 is in the loaded state by analyzing a history of the machine location and goal selection. The goal selection may be selected by the operator or determined using an algorithm. The load indication module 212 is communicably coupled to a machine control module 214.

The system 200 includes the machine control module 214. The machine control module 214 is embodied as a worksite-wide control module that is capable of sending and receiving signals across various modules associated with the machines 102, 104 and the worksite 100. The machine control module 214 may be located at a remote location. In one example, the machine control module 214 is located at the remote operator station 106. The machine control module 214 is activated based on a user command More particularly, the machine control module 214 is activated based on the command received from the operator seated at the remote operator station 106. The machine control module 214 is communicably coupled to the monitoring module 202. The machine control module 214 is configured to receive the signals indicative of the one or more operational parameters associated with the machine 102 from the monitoring module 202.

Based on the receipt of the user command and the loaded state of the machine 102, the machine control module 214 is configured to control an automated traversal of the machine 102 on the worksite 100 between the load point 112 and the dump point 114. The automated traversal of the machine 102 is based on a site map of the worksite 100 and the information received from the monitoring module 202, the load indication module 212.

The site map may include information related to the location of the various load and dump points, such as the load point 112 and the dump point 114, on the worksite 100. Additionally, the site map may include other information related to the worksite 100. Based on system requirements, one or more attributes of the site map may be modified or updated on a real time basis by the operator. The site map may be stored in a database 216. The database 216 may be located at the remote operator station 106. The database 216 may be communicably coupled to the machine control module 214 either directly as shown in the accompanying drawings, or indirectly through any other components or devices.

The database 216 may also store a number of different routes that the machine 102 may use to reach the dump point 114. Once the machine 102 is loaded with the payload, the machine 102 may use one of the various available routes to reach the dump point 114. In one example, the machine control module 214 may plan a route from the load point 112 to the dump point 114. The route plan may be selected by the operator or by a production planning software, based on system requirements. Once the machine 102 reaches the dump point 114, the machine control module 214 controls a dumping action of the machine 102 at the dump point 114. On completing the dumping action, the machine control module 214 may send signals to the machine 102 in order to control the traversal of the machine 102 from the dump point 114 to the load point 112, or any other load point at the worksite 100. The route plan from the dump point 114 to the respective load point may be planned and executed by the machine control module 214.

Further, the machines 102, 104 deployed on the worksite 100 may perform operations that require isolation of the worksite 100 or portions of the worksite 100. For this purpose, the system 200 includes an area isolation control module 218. The area isolation control module 218 is communicably coupled with a control module 220 that is present on-board the machine 102. The area isolation control module 218 is configured to monitor the worksite 100 having the machines 102, 104. More particularly, the area isolation control module 218 is configured to generate a signal indicative of a state of a machine barrier present on the worksite 100. The machine barrier may be in an activated state or a deactivated state. Further, the area isolation control module 218 additionally determines a presence of a personnel barrier. The area isolation control module 218 may be located at a remote location. In one example, the area isolation control module 218 is located at the remote operator station 106. The area isolation control module 218 may receive signals from various sensors and switches (not shown) present at the worksite 100 or the remote operator station 106 to determine the state of the machine barrier or the presence of the personnel barrier, or both at the worksite 100.

In a situation wherein the area isolation control module 218 is in the operational state and detects the activated state of the machine barrier and/or the presence personnel barrier, the area isolation control module 218 determines a specific area on the worksite 100 at which the activated state of the machine barrier and/or the presence of the personnel barrier is detected. Based on the determination, the area isolation control module 218 may trigger the shutdown of one or more machines 102, 104 proximate to the location at which the machine barrier and/or the personnel barrier was detected.

For example, in a situation wherein the machine control module 214 receives signals indicating the activated state of the machine barrier and/or the presence of the personnel barrier from the area isolation control module 218, the machine control module 214 is configured to control an automated shutdown of the machine 102. In one example, based on the signals received, the machine 102 may be shutdown during the automated traversal of the machine 102 from the load point 112 to the dump point 114, or vice versa. In one example, the machine control module 214 is configured to issue a command signal to shutdown the engine of the machine 102 and/or engage a braking system of the machine 102. The command signals may be sent to an engine control module 222 and a braking module 224 of the machine 102. The engine control module 222 and the braking module 224 may in turn shutdown the engine and/or engage the braking system of the machine 102 respectively.

One of ordinary skill in the art will appreciate that the area isolation control module 218 may not directly communicate with the machine 102 in order to shutdown the machine 102 in case of detection of the machine or personnel barriers. The system 200 may additionally include other components or devices not described herein in order to implement the described functionality of the system 200.

Based on the operational state of the machine 102, the machine control module 214 is configured to receive signals indicative of at least one of the machine speed, machine position, machine heading direction, from the monitoring module 202. Further, the machine control module 214 also receives signals indicative of the loaded state of the machine 102 from the load indication module 212. In a situation wherein the machine control module 214 determines that the machine 102 is loaded with the payload, the machine control module 214 triggers the automated traversal of the machine 102 on the worksite 100 from the load point 112 to the dump point 114. Further, the route plan from the load point 112 to the dump point 114 may be decided based on the site map and the inputs from the operator or the production planning software.

During the automated traversal of the machine 102, if the machine control module 214 receives signals indicative of the activated state of the machine barrier and/or the presence of the personnel barrier, the machine control module 214 may trigger the automated shutdown of the machine 102 that is proximate to the location at which the machine barrier or the personnel barrier is detected.

In a situation in which no machine barrier and/or personnel barrier is detected, the machine control module 214 may send signals to the control module 220 present on-board the machine 102 in order to tram the machine 102 towards the dump point 114. Further, on reaching the dump point 114, the machine control module 214 may send signals to the control module 220 of the machine 102 to automatically control the dumping action at the dump point 114. After completion of the dumping action, the machine control module 214 is configured to send signals to the machine 102 to drive back to the load point 112 for a subsequent operation. In one example, the control module 220 may be a separate module that is configured to receive the signals from the machine control module 214. Alternatively, the control module 220 may be integrated with the electronic control module (ECM) of the respective machine 102, 104 without any limitations.

The various modules disclosed herein are exemplary in nature. The operation and functionalities of the modules may vary as per system requirements. The modules may further include sub-modules not described herein in order to implement the described functionality of the system 200.

The machine control module 214, the area isolation control module 218, and the control module 220 may embody a single microprocessor or multiple microprocessors for receiving signals from components of the system 200. Numerous commercially available microprocessors may be configured to perform the functions of the machine control module 214, the area isolation control module 218, and the control module 220. A person of ordinary skill in the art will appreciate that the machine control module 214, the area isolation control module 218, and the control module 220 may additionally include other components and may also perform other functions not described herein.

INDUSTRIAL APPLICABILITY

The present disclosure relates to the system 200 for automated operation of the machines 102, 104 deployed on the worksite 100. The machines 102, 104 are operated by the operator seated at the remote operator station 106. The system 200 includes means to detect one or more operational parameters related to the machine 102, 104 from the respective monitoring module 202. The system 200 also receives signals pertaining to the presence of the payload on the machine 102, 104, that is the loaded state of the machine 102, 104, from the load indication module 212. Based on the signals received, the system 200 is configured to control the automated traversal of one or more machines 102, 104 on the worksite 100 between the respective load points and dump points. Further, once the machine 102, 104 reaches the respective dump point, the system 200 is configured to control the dumping action of the machine 102, 104 at the dump point. The system 200 is also configured to send signals for the automatic traversal of the machine 102, 104 from the respective dump point to any load point at the worksite 100.

The system 200 also includes the area isolation control module 218. The area isolation control module 218 receives the signals indicative of the state of the machine barrier and/or the presence of the personnel barrier on the worksite 100. Based on the signals received, the system 200 is configured to temporarily shutdown one or more machines 102, 104 that are traversing between the respective load and dump points.

The system 200 provides a reliable traversal of the machine 102, 104 between the respective load and dump points. Also, the system 200 provides means for shutting down the operation of one or more machines 102, 104 on the worksite 100 based on the state of the machine barrier or the presence of the personnel barrier. Further, the system 200 is not worksite specific or machine specific, and hence may be employed at different worksites. The system 200 may be readily installed at a new worksite or may be retrofitted at an existing worksite.

Figure 3:
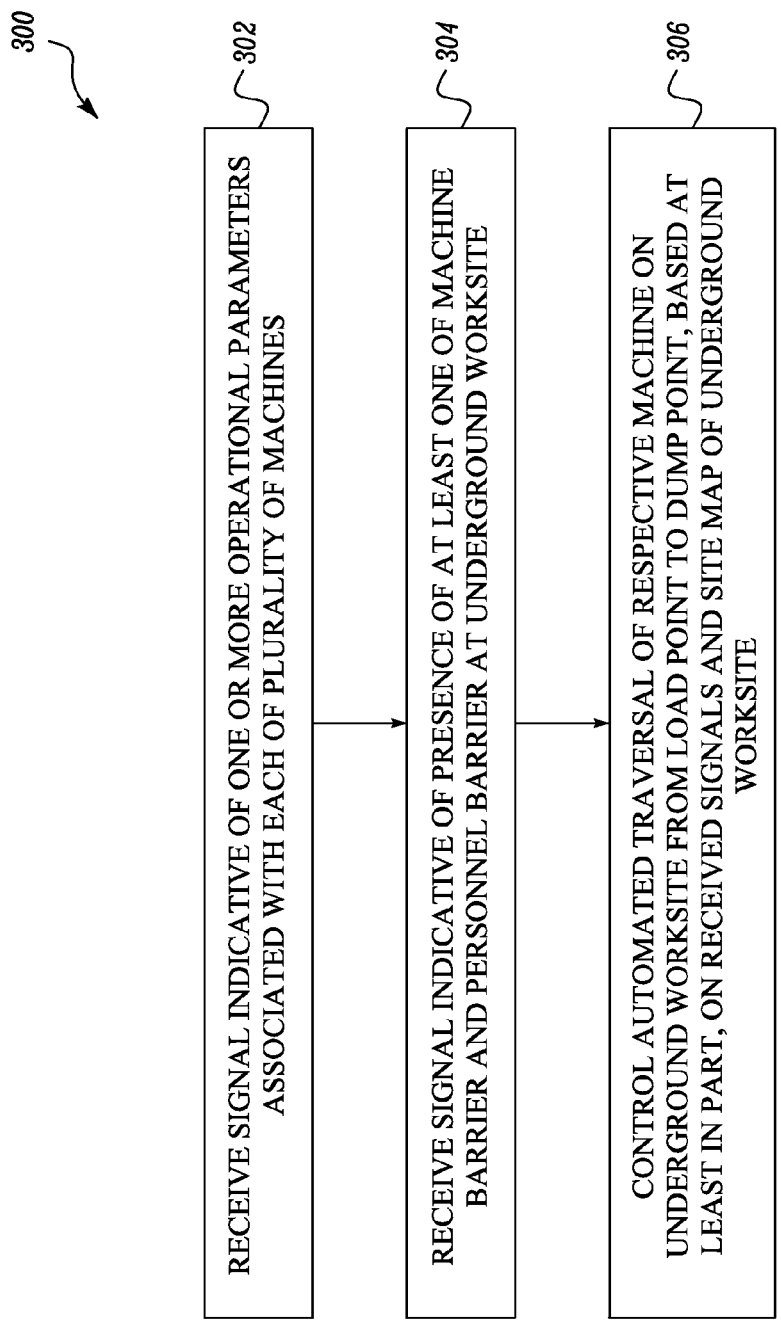
FIG. 3 is a flowchart of a method for automated operation of the machines at the underground worksite, according to one embodiment of the present disclosure.

FIG. 3 is a flowchart for a method 300 of the automated operation of the machines 102 at the worksite 100. The method 300 disclosed herein will now be described in relation to the automated operation of the machine 102. However it should be understood that the method 300 disclosed herein is also applicable to the automated operation of the machine 104, or any other machine operating on the worksite 100. At step 302, the machine control module 214 receives the signals indicative of one or more operational parameters associated with the machine 102 from the monitoring module 202. The one or more operational parameters may include at least one of the machine speed, the machine position, and the machine heading. The machine control module 214 also receives the signal indicative of the loaded state of the machine 102 from the load indication module 212.

At step 304, the machine control module 214 receives the signal indicative of the state of the machine barrier and/or the presence of the personnel barrier at the worksite 100 from the area isolation control module 218. Further, the machine control module 214 is configured to control the automated shutdown of the machine 102 based, at least in part, on the state of the machine barrier and/or the presence of the personnel barrier. More particularly, the machine control module 214 issues the command signal to shutdown the engine of the machine 102 and engage the brake system of the machine 102 for controlling the shutdown of the machine 102. At step 306, the machine control module 214 controls the automated traversal of the machine 102 on the worksite 100 between the load point 112 and the dump point 114, based at least in part, on the received signals and the site map of the worksite 100. Further, on reaching the dump point 114, the machine control module 214 is configured to control the dumping action of the machine 102 at the dump point 114.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for automated operation of a plurality of machines deployed on an underground worksite, the system comprising:

a monitoring module provided on-board each of the plurality of machines, the monitoring module configured to generate a signal indicative of one or more operational parameters associated with the respective machine;

an area isolation control module associated with the underground worksite, the area isolation control module configured to generate a signal indicative of at least one of a state of a machine barrier and a presence of a personnel barrier at the underground worksite; and a machine control module coupled to the monitoring module and the area isolation control module, the machine control module configured to:

receive the signal indicative of the one or more operational parameters associated with the respective machine based, at least in part, on a loaded state of the respective machine;

receive the signal indicative of at least one of the state of the machine barrier and the presence of the personnel barrier at the underground worksite; and control an automated traversal of the respective machine on the underground worksite between a load point and a dump point, based at least in part, on the received signals and a site map of the underground worksite.

2. The system of claim 1, wherein the one or more operational parameters includes at least one of a machine speed, a machine position, and a machine heading.

3. The system of claim 1 further comprising:
a load indication module provided on-board each of the plurality of machines, the load indication module configured to generate a signal indicative of the loaded state of the respective machine.

4. The system of claim 1, wherein the machine control module is located at a remote location.

5. The system of claim 1, wherein the area isolation control module is located at a remote location.

6. The system of claim 1, wherein the monitoring module includes at least one of a LADAR sensor, a rotary sensor, and an inertial monitoring unit.

7. The system of claim 6, wherein the monitoring module further includes a plurality of image capturing devices associated with each of the plurality of machines.

8. The system of claim 1, wherein the machine control module is further configured to:
control an automated shutdown of the respective machine based, at least in part, on the state of the machine barrier and the presence of the personnel barrier.

9. The system of claim 8, wherein the machine control module is further configured to issue a command signal to shutdown an engine of the respective machine and engage a brake of the respective machine for controlling the shutdown of the respective machine.

10. The system of claim 1, wherein the machine control module is further configured to control a dumping action of the respective machine at the dump point.

11. The system of claim 1, wherein the machine control module is activated based on a user command.

12. A method for automated operation of a plurality of machines at an underground worksite, the method comprising:
receiving a signal indicative of one or more operational parameters associated with each of the plurality of machines;

receiving a signal indicative of a presence of at least one of the state of the machine barrier and the presence of the personnel barrier at the underground worksite; and controlling an automated traversal of the respective machine on the underground worksite between a load point and a dump point, based at least in part, on the received signals and a site map of the underground worksite.

13. The method of claim 12 further comprising:
receiving a signal indicative of a loaded state associated with the respective machine.

14. The method of claim 12, wherein the one or more operational parameters includes at least one of a machine speed, a machine position, and a machine heading.

15. The method of claim 12 further comprising:
receiving an image feed associated with the plurality of machines.

16. The method of claim 12 further comprising:
controlling an automated shutdown of the respective machine based, at least in part, on the state of the machine barrier and the presence of the personnel barrier.

17. The method of claim 16 further comprising:
issuing a command signal to shutdown an engine of the respective machine and engage a brake of the respective machine for controlling the shutdown of the respective machine.

18. The method of claim 12 further comprising:
controlling a dumping action of the respective machine at the dump point.

* * * * *